(12) United States Patent
Shim et al.

(10) Patent No.: US 11,811,873 B2
(45) Date of Patent: *Nov. 7, 2023

(54) DISTRIBUTION HUB FOR INTERNET-OF-THINGS DATA

(71) Applicant: Verizon Patent and Licensing Inc., Basking Ridge, NJ (US)

(72) Inventors: Cheul Shim, River Vale, NJ (US); Michael G. Hogan, Sussex, NJ (US); Angel Polito, Basking Ridge, NJ (US); Terence P. Maguire, Park Ridge, NJ (US); Thierry R. Sender, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/582,228

(22) Filed: Jan. 24, 2022

(65) Prior Publication Data

US 2022/0150309 A1 May 12, 2022

Related U.S. Application Data

(63) Continuation of application No. 17/032,299, filed on Sep. 25, 2020, now Pat. No. 11,265,379, which is a continuation of application No. 15/715,281, filed on Sep. 26, 2017, now Pat. No. 10,819,794.

(51) Int. Cl.
| | | |
|---|---|---|
| *G06F 15/16* | (2006.01) | |
| *H04L 67/12* | (2022.01) | |
| *H04L 69/08* | (2022.01) | |
| *H04L 67/56* | (2022.01) | |
| *H04L 67/63* | (2022.01) | |
| *H04L 67/565* | (2022.01) | |

(Continued)

(52) U.S. Cl.
CPC .............. *H04L 67/12* (2013.01); *H04L 67/56* (2022.05); *H04L 67/565* (2022.05); *H04L 67/63* (2022.05); *H04L 69/08* (2013.01); *H04L 67/143* (2013.01); *H04L 69/329* (2013.01)

(58) Field of Classification Search
USPC ................................................ 709/217, 223
See application file for complete search history.

(56) References Cited

U.S. PATENT DOCUMENTS

| | | | | |
|---|---|---|---|---|
| 9,372,922 | B2 * | 6/2016 | Shaashua | ................ H04L 67/10 |
| 10,382,203 | B1 * | 8/2019 | Loladia | ................... H04L 63/06 |

(Continued)

*Primary Examiner* — Wing F Chan
*Assistant Examiner* — Andrew Woo

(57) ABSTRACT

An internet-of-things (IoT) distribution hub enables delivery of formatted IoT data to any of multiple hosting platforms as dynamically configurable by an IoT device owner. A service node in a distributed network provides, to an IoT device, a device key for accessing an IoT distribution network. The service node receives a selection of a hosting platform for the IoT device, wherein the selected hosting platform is one from a group of available hosting platforms available through the IoT distribution network. The service node maps the IoT device to a virtual device proxy for the selected hosting platform and receives a request from the IoT device to forward IoT data. The request includes the device key. The service node forwards the IoT data to the selected hosting platform via the virtual device proxy.

20 Claims, 12 Drawing Sheets

(51) Int. Cl.
*H04L 69/329* (2022.01)
*H04L 67/143* (2022.01)

(56) References Cited

U.S. PATENT DOCUMENTS

| | | | |
|---|---|---|---|
| 2016/0198465 A1* | 7/2016 | Britt | H04M 15/8055 |
| | | | 455/450 |
| 2016/0205078 A1 | 7/2016 | James et al. | |
| 2017/0359417 A1* | 12/2017 | Chen | H04W 60/04 |

* cited by examiner

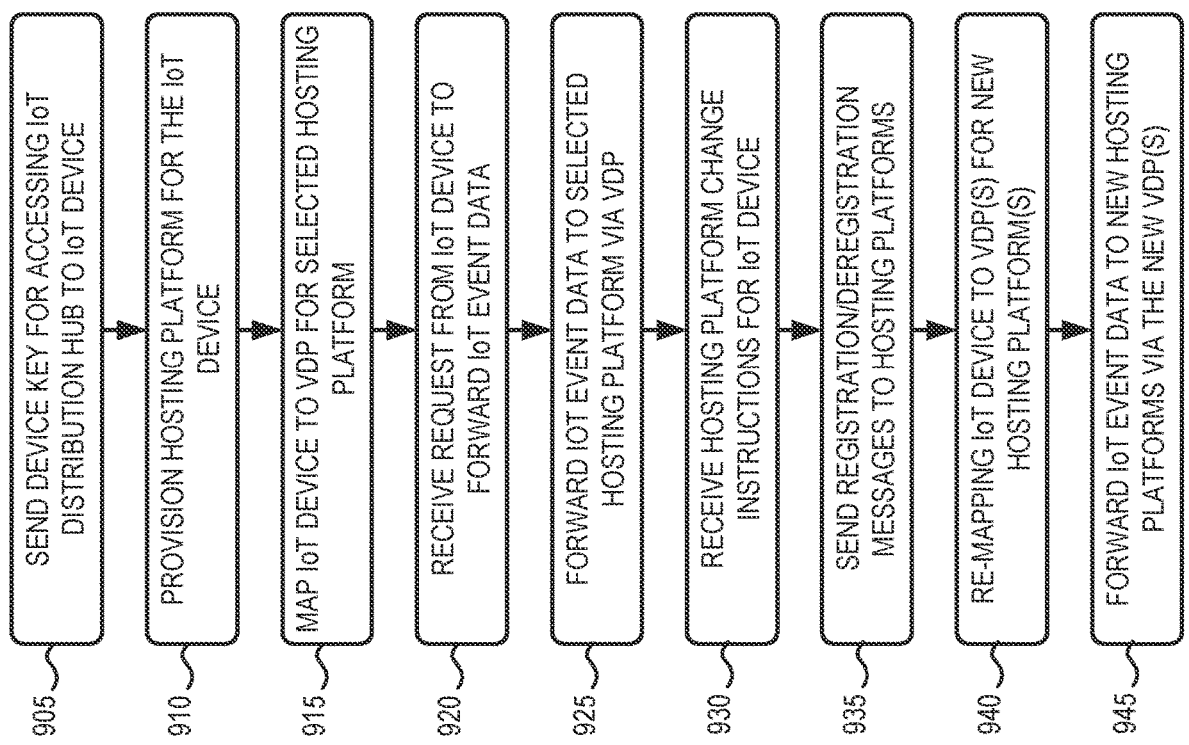

DISTRIBUTION HUB FOR INTERNET-OF-THINGS DATA

CROSS-REFERENCE TO RELATED APPLICATION

This application is a continuation of U.S. patent application Ser. No. 17/032,299, filed on Sep. 25, 2020, which is a continuation of U.S. patent application Ser. No. 15/715,281, filed on Sep. 26, 2017 (and issued as U.S. Pat. No. 10,819,794 on Oct. 27, 2020), both of which are titled "Distribution Hub for Internet-of-Things Data," and the contents of which are incorporated herein by reference.

BACKGROUND

The Internet of Things (IoT) includes a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device, such as a coordinator, a gateway, etc.) or directly. Since IoT technology has nearly limitless applications that can be leveraged to form new and useful services, interest among service providers and developers in IoT technology continues to increase. In many instances, IoT data is useful to individual consumers for monitoring, alerts, historical trends, etc., related to individual devices. In other cases, IoT data can be used by the device makers or service entities associated with each IoT device for monitoring their products or services. IoT services are typically provided through IoT platforms that use proprietary software and/or hardware for different IoT service providers.

BRIEF DESCRIPTION OF THE DRAWINGS

FIG. 9 is a flow diagram illustrating an exemplary process for providing IoT data to a selected hosting platform, according to an implementation described herein.

DETAILED DESCRIPTION OF THE PREFERRED EMBODIMENTS

The following detailed description refers to the accompanying drawings. The same reference numbers in different drawings may identify the same or similar elements.

Today, companies offer different Internet-of-Things (IoT) platforms which may provide different types of services. An IoT platform, for example, may provide device connectivity, collect data, process/analyze data, enable device management, and other features that facilitate the capabilities of IoT devices. There is limited interoperability between IoT platforms. For example, some IoT platforms offer services that require use of proprietary hardware and/or software components. Because of this lack of interoperability, IoT device manufacturers face difficult decisions in selecting an IoT platform at the time of product development. Once selected, the IoT devices are typically limited to being permanently connecting through the selected platform. Selection of one IoT platform may leave the customer locked out from using features developed in other IoT platforms and/or adjusting to future consumer demand. Furthermore, system failures and/or security breaches at the platform level may leave customers without other service options.

Accordingly, a new approach is needed to shift the IoT ecosystem from the current platform-centric environment to one more friendly to device makers and owners. As described further herein, an IoT distribution hub is provided to dynamically bridge IoT devices and IoT platforms in a secure an optimized way.

According to one implementation, an IoT distribution hub enables delivery of IoT data to multiple different hosting platforms. The IoT distribution hub includes distributed service nodes. The IoT distribution hub may provide, to an IoT device, a device key for accessing a best-fit service node. The IoT distribution hub may receive a selection of a hosting platform for the IoT device, wherein the selected hosting platform is one from group of available hosting platforms available through the IoT distribution hub. The IoT distribution hub may map the IoT device to a virtual device proxy for the selected hosting platform and may receive a request from the IoT device to forward IoT data. The request must include the device key for both authentication and authorization purpose. The IoT distribution hub may forward the control commands to IoT devices from the selected hosting platform via the virtual device proxy. When an IoT device owner selects a different hosting platform, the IoT distributing hub may map the IoT device to a different virtual device proxy for the newly selected hosting platform and forward subsequent IoT data to the new hosting platform accordingly.

Figure 1:
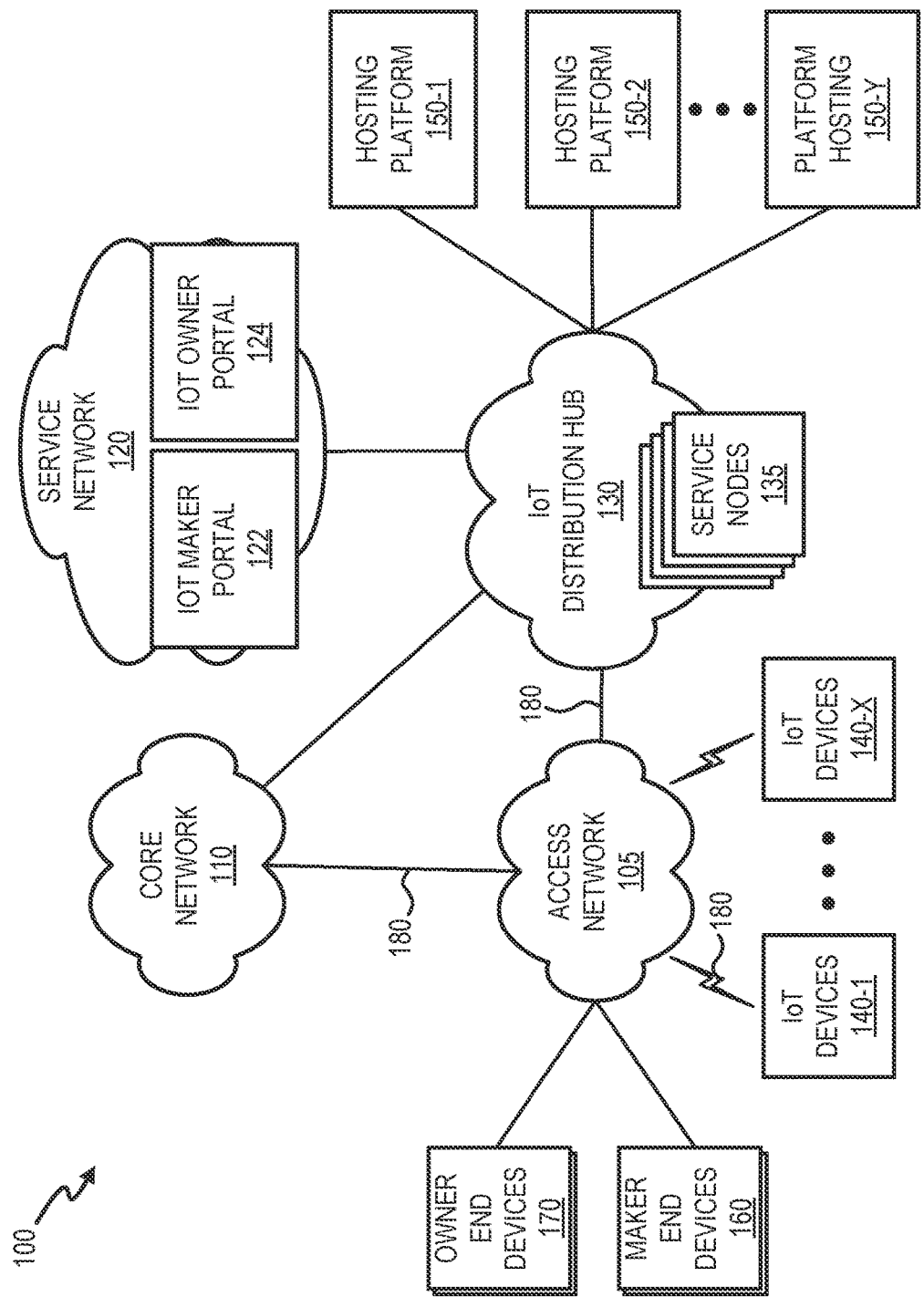
FIG. 1 is a diagram that depicts an exemplary network environment in which systems and methods described herein may be implemented.

FIG. 1 is a diagram that depicts an exemplary network environment 100 in which systems and methods described herein may be implemented. As illustrated, environment 100 may include an access network 105, a core network 110, a service network 120, and an IoT distribution hub 130. Service network 120 may have multiple network elements including, but not limited to, an IoT maker portal 122 and an IoT owner portal 124. Environment 100 may also include IoT devices 140-1 through 140-X (also referred to as collectively as "IoT devices 140" and, individually or generically as "IoT device 140"), hosting platforms 150-1 through 150-Y (also referred to as collectively as "hosting platforms 150" and, individually or generically as "hosting platform 150"), maker end devices 160, and owner end devices 170.

As further illustrated, environment 100 includes communicative links 180 between the network elements and networks (although only three are referenced in FIG. 1). A network element may transmit and receive data via link 180. Environment 100 may be implemented to include wireless and/or wired (e.g., electrical, optical, etc.) links 180. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 180 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple IoT maker portals 122, IoT owner portals 124, and so forth. Additionally, or alternatively, according to other embodiments, multiple network elements may be implemented on a single device, and conversely, a network element may be implemented on multiple devices. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN) as defined by standards governing entities, such as the Third Generation Partnership Project (3GPP) or the International Telecommunication Union (ITU). The RAN may be a Third Generation (3G) RAN, a Fourth Generation (4G) RAN, a 4.5G RAN, a future generation wireless network architecture (e.g., a Fifth Generation (5G) RAN), etc. By way of further example, access network 105 may include an Evolved Universal Mobile Telecommunications System (UMTS) Terrestrial Radio Access Network (E-UTRAN) of a Long Term Evolution (LTE) network or LTE-Advanced (LTE-A) network, a U-TRAN, a UMTS RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes IoT maker portal 122 and IoT owner portal 124. According to other exemplary embodiments, IoT maker portal 122, IoT portal 124, and/or a portion thereof may be implemented in core network 110 and are interfaced with IoT distribution hub 130.

IoT maker portal 122 may include one or more network services that provide a user interface to IoT device manufacturer with a complete set of development software, tools, supports, documentations and community services. As described further herein, users of IoT maker portal 122 are able to acquire information to register and provision IoT devices 140 via maker end devices 160.

IoT owner portal 124 may include one or more network services that provide a user interface to IoT device owner with various IoT device management services applied at the IoT distribution hub 130. As described further herein, users of IoT owner portal 124 may manage (e.g., configure, issue commands, update, monitor, etc.) service associations of the IoT distribution hub 130 between IoT devices 140 and hosting platform 150 via owner end devices 170.

IoT distribution hub 130 may include one or multiple networks of one or multiple types. According to an exemplary implementation, IoT distribution hub 130 includes a backhaul network. For example, the backhaul network may be implemented as an optical transport network or other suitable architecture. As described further herein, IoT distribution hub 130 provides a dynamic "any-to-any" service allowing any IoT devices 140 initially provisioned for any other hosting platform (e.g., any hosting platforms 150). For example, IoT device 140 may transmit IoT data to a hosting platform 150 via access network 105 and IoT distribution hub 130. According to an exemplary implementation, when access network 105 is implemented as an LTE RAN or an LTE-A RAN, IoT distribution hub 130 may directly connect to an eNB. According to such architecture, the IoT data may be transmitted using a Non-Access Stratum (NAS) control channel and may not traverse network elements of a complimentary part of core network 110. As described further herein, IoT distribution hub 130 may include a collection of dedicated service nodes 135 that act as a communication hub for connecting IoT devices 140 to the configured hosting platforms 150. Service nodes 135 may include one or more network devices in a distributed architecture. Service nodes 135 are described further in connection with, for example, FIG. 3.

IoT device 140 includes logic to collect, obtain, and/or generate IoT data as a part of an IoT device service. For example, IoT device 140 may be implemented to include various technologies, such as a sensor, a tag, a camera, an antenna, etc., that collects, obtains, and/or generates IoT data. According to various implementations, IoT device 140 may be a stationary device or a mobile device (e.g., an IoT device 140 attached to a drone, a mobile IoT device, an IoT device embedded or attached to a living organism (e.g., an animal or a person), etc.). IoT device 140 may include a component (e.g., a Global Positioning System (GPS) chipset, etc.) that provides location-aware functionality. IoT device 140 may be powered by an internal source, an external source, a battery, an outlet, electromagnetic waves, and so forth.

According to an exemplary embodiment, IoT device 140 includes a communication interface via which IoT device 140 can transmit and receive data. According to an exemplary embodiment, the communication interface includes an LTE and/or an LTE-A modem (referred to herein as "LTE modem"). The LTE modem transmits and receives data using an LTE NAS control channel. According to an exemplary implementation, the LTE NAS control channel can be used to transport small payloads (e.g., 256 bytes or less). For example, IoT device 140 may transmit IoT data to IoT distribution hub 130 via NAS. According to another implementation, IoT device 140 may transmit IoT data to via any type of wired and wireless backhaul networks.

According to other embodiments, the communication interface of IoT device 140 includes a modem other than the LTE modem and IoT device 140 transmits and receives data using conventional or well-known communication technologies other than the LTE NAS control channel. Thus, IoT device 140 may communicate with service network 120 via access network 105, core network 110, and/or backhaul network 130 via the communication interface. IoT device 140 may also communicate with local devices (not illustrated) using various short-range communication technologies. For example, IoT device 140 may obtain IoT data from a sensor.

According to an exemplary embodiment, IoT device 140 includes logic that supports the IoT services. For example, IoT device 140 includes logic to interpret and execute a command via an application program interface (API) call, which is received via the communication interface. IoT device 140 may also include logic that allows for identifying an API when performing the function or operation of the API call. According to implementations described herein, each IoT device 140 may be registered for use with IoT distribution hub 130 and provisioned for use with protocols of IoT distribution hub 130. Registration may indicate an IoT device owner, an IoT device ID, an IoT device certificate, an IoT device IP address, etc. The registered IoT devices 140 may also be passed through an onboarding process, which ensures that each IoT device 140 has the necessary software (or firmware) loaded for security, modeling, and best practice to maximize network performance.

Hosting platform 150 includes one or more network devices that provide an IoT data service. The IoT data service may include receiving packets that are transmitted by IoT devices 140 and implementing models to collect, store, analyze, and/or present event data from IoT devices 140. Hosting platform 150 may also provide data-driven applications and/or analytic services for owner end devices 170 that owners of IoT devices 140 may use to monitor IoT devices 140. Each hosting platform 150 may use different protocols, formats, and commands (such as API calls) for ingesting and processing IoT data. Examples of hosting platforms that may use different protocols and commands include Amazon® Web Services (AWS), Microsoft Azure®, IBM Watson®, Verizon® ThingSpace®, etc.

Each of maker end device 160 and owner end device 170 may include a communicative and computational device. End devices 160/170 may be implemented as a mobile device, a portable device, or a stationary device. For example, end device 160/170 may be implemented as a smartphone, a tablet, a computer (e.g., a laptop, a desktop, a palmtop, etc.), a personal digital assistant, a terminal, and so forth. According to an exemplary embodiment, maker end device 160 provides users with access to IoT maker portal 122, and owner end device 170 provides users with access to IoT owner portal 124. For example, maker end device 160 may include a client application, such as a web browser or other suitable software application, for device maker operations. Conversely, owner end device 170 may include a different client application for IoT owner operations. Users may be considered an operator of end devices 160/170. For example, a user may be a network administrator, a customer, an IoT device manufacturer, an IoT device owner, and so forth.

Figure 2:
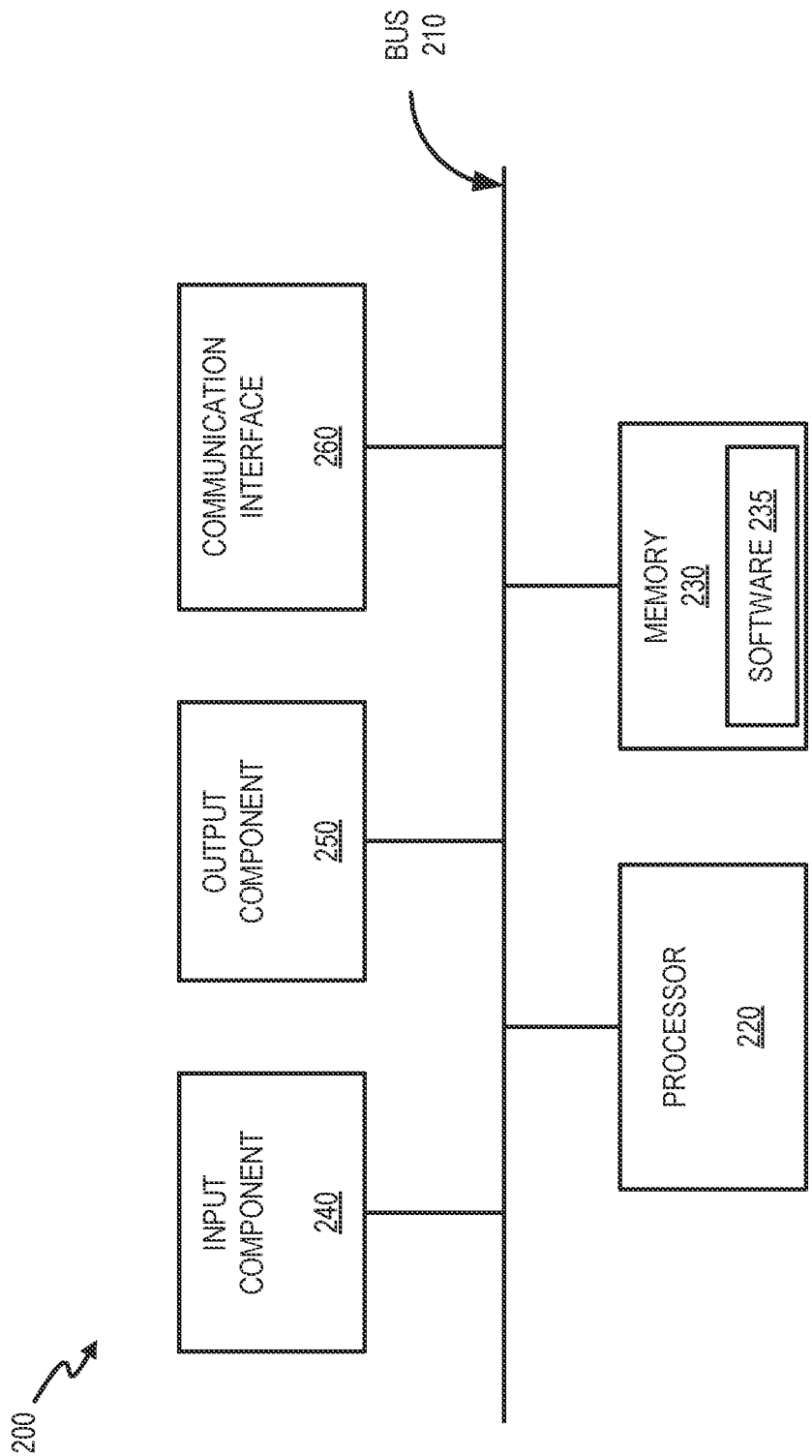
FIG. 2 is a diagram of exemplary components that may be included in one or more of the devices shown in FIG. 1.

FIG. 2 is a diagram illustrating exemplary physical components of a device 200. Device 200 may correspond to system elements depicted in environment 100. Device 200 may include a bus 210, a processor 220, a memory 230 with software 235, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 is also intended to include firmware, middleware, microcode, hardware description language (HDL), and/or other form of instruction. By way of example, with respect to the network elements that include logic to provide the IoT distribution services described herein, these network elements may be implemented to include software 235. Additionally, for example, end device 160/170 may include software 235 (e.g., an application to communicate with portals 122/124, etc.) to perform tasks as described herein.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. For example, communication interface 260 may include one or more antennas to transmit and/or receive RF signals over the air. Communication interface 260 may, for example, receive RF signals and transmit them over the air to IoT device 140, and receive RF signals over the air from IoT device 140. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. As another example, device 200 may include one or more switch fabrics instead of, or in addition to, bus 210. Additionally, or alternatively, one or more components of device 200 may perform one or more tasks described as being performed by one or more other components of device 200.

Figure 3:
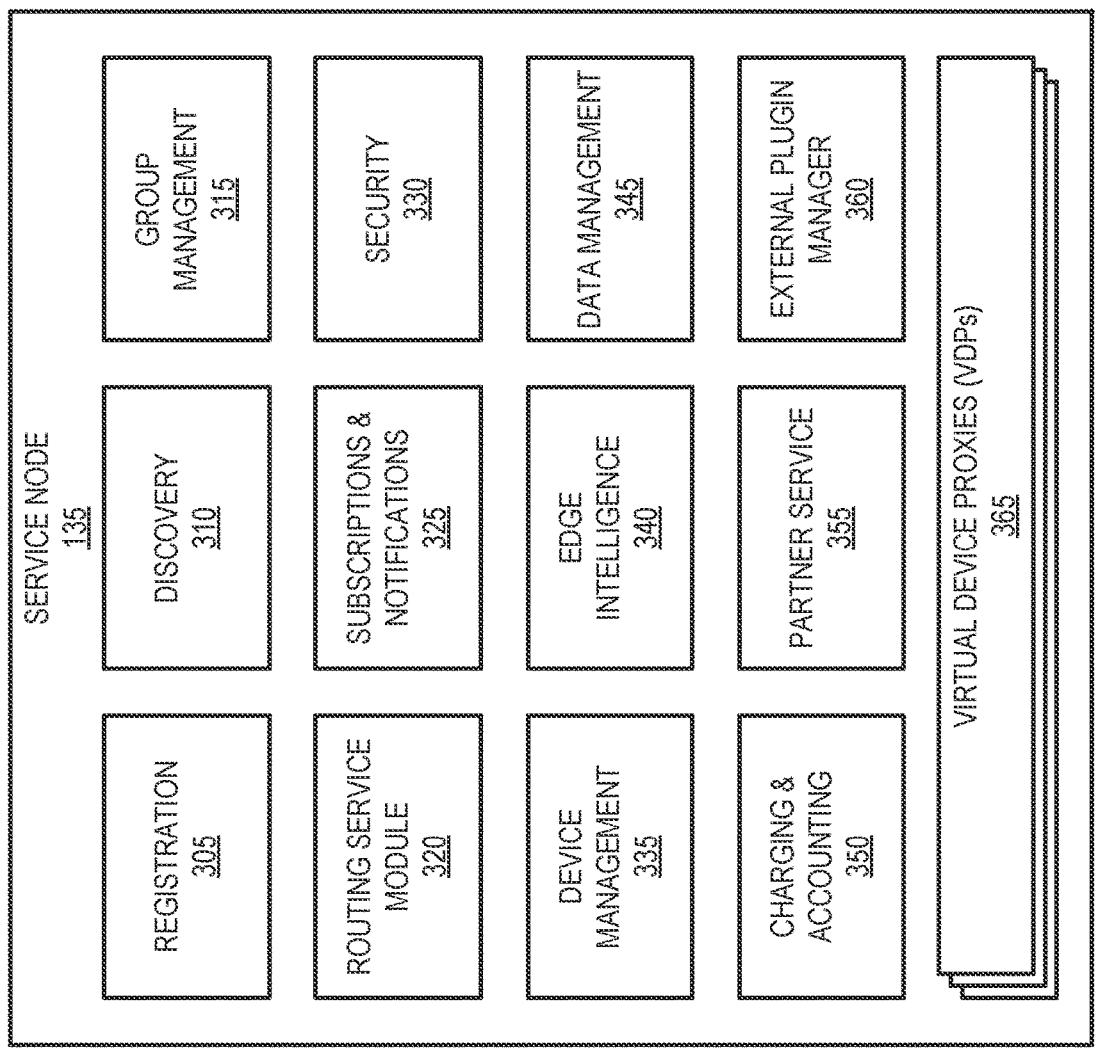
FIG. 3 is block diagram of illustrating exemplary logical aspects of service nodes in the IoT distribution hub of FIG. 1.

FIG. 3 is block diagram of illustrating exemplary logical components of service node 135 of IoT distribution hub 130. The logical components of FIG. 3 may be implemented, for example, by processor 220 in conjunction with memory 230/software 235. As shown in FIG. 3, service node 135 may include a registration module 305, a discovery module 310, a group management module 315, a routing service module 320, a subscriptions & notifications module 325, a security module 330, a device management module 335, an edge intelligence module 340, a data management module 345, a charging and accounting module 350, a partner service module 355, and an external plugin module 360.

Registration module 305 manages registrations of all IoT devices 140. IoT devices 140 perform registration with IoT distribution hub 130 in order to use IoT delivery services. As a result of successful registration, IoT devices 140 can establish a relationship allowing them to exchange information with hosting platforms 150 via IoT distribution hub 130. Registration module 305 may handle all registration requests from the IoT devices 140.

Discovery module 310 may search information about resources and attributes in IoT distribution hub 130. Discovery module 310 may receive and respond to discovery requests from, for example, IoT device 140 or a service application. The discovery request may indicate the address of the resource where the discovery is to be performed. Upon receiving such request, discovery module 310 may discover, identify, and return the matching information regarding discovered resources. The result of a discovery request from an IoT device or service application depends upon the filter criteria and is subject to access control policy allowed by a user's service subscription.

Group management module 315 is responsible for handling group related requests, such as managing multiple IoT devices 140 owned by the same customer. Group management module 315 enables IoT distribution hub 130 to perform bulk operations on multiple IoT devices 140 and/or associated hosting platforms 150 that are part of a group. Bulk operations include read, write, subscribe, notify, device management, etc.

Routing service module 320 may configure a routing table that maps IoT devices 140 to hosting platforms 150. Routing service module 320 defines the bi-directional routing table for inbound requests (from IoT devices 140) and outbound requests (from hosting platform 150). As described further herein, routing can be applied per IoT device 140 and per a group of IoT devices 140 as configured by IoT device owners (e.g., using owner end devices 170).

Subscriptions & notifications module 325 may provide notifications pertaining to a subscription that tracks event changes on a resource. A subscription to a resource may be initiated by an IoT device 140, and is granted by subscriptions & notifications module 325 subject to access control policies. During an active resource subscription, subscriptions & notifications module 325 may send a notification regarding an event to an address or device identifier provided by the subscriber.

Security module 330 may prevent security threats at the distribution network stage before reaching the hosting platform 150. Security module 330 may include, for example, a network security service, an agentless intrusion detection service, an API proxy service, a device certificate service, and a universal identity service (UIS). The network security services may include support for virtual private networks (VPNs), mobile private networks (MPNs), secure cloud interconnect (SCI), and/or software defined perimeters (SDP). The agentless intrusion detection service may generate real-time analytics for the data replicated (tapped) at the edge in order to detect signatures of malware and anomalies based on either predefined or automatically learned traffic patterns. The insights from the analytics may be presented through IoT owner portal 124. The API proxy service in security module 330 may authenticate API calls using, for example, a device key (or "dkey") provided to IoT device 140 at the time of IoT device registration. The API proxy service may also provide access filtering, throttling and rate limiting. The device certificate service may deliver a Public Key Infrastructure (PKI)-based certificate to an IoT device 140 in an automatic and secure way. The device certificate service may rely on PKI and SCEP (Simple Certificate Enrollment Protocol). With successful installation of a device certificate, IoT device 140 can make a secure SSL/TLS tunnel to IoT distribution hub 130 through a two-way authentication. The UIS includes identity proofing, credential issuance, strong authentication, and digital signature services. UIS is used for secure access to the IoT maker portal 122 and IoT owner portal 124 respectively.

Device management module 335 may enable management of device capabilities on IoT devices 140 such as device configuration, diagnostics, monitoring, firmware management and topology management. Device configuration may include enabling and disabling the device, provisioning device configuration parameters, etc. Device diagnostics and monitoring may include troubleshooting through the use of diagnostic tests and retrieval of operational status and statistics associated with IoT device 140. Device firmware management may provide software lifecycle management for IoT device firmware components. The firmware lifecycle includes actions to download, update, or remove a firmware image. Device topology management may configure the topology of the attached IoT device at local area network and retrieve attached IoT device 140 information, transport protocol at a local area network, online/offline status of attached IoT devices 140, etc.

Edge intelligence module 340 provides an intelligent data processing service at the service node 135 with closest geo-proximity to IoT device 140. The term "edge intelligence" as used here refers to performing useful processing of IoT data as close to the collection point as possible and allowing systems to make some operational decisions at the service node 135, sometimes semi-autonomously. Edge intelligence is in contrast to backhauling the data feed to a data center and then processing it at the data center before pushing operational decisions back to the edge node. Edge intelligence module 340 is described further in connection with FIG. 7, for example.

Data management module 345 may provide IoT data storage and mediation functions. Typical data managed within IoT distribution hub 130 include application data, subscriber information, location information, IoT device information, semantic information, communication status, access permission, etc. Data management module 345 may also include the capability of collecting data for the purpose of aggregating large amounts of IoT data, converting this IoT data into a specified format, and storing the converted IoT data for analytics and semantic processing. The data can be either raw data transparently retrieved from IoT devices 140, or processed data which is calculated and/or aggregated by, for example, edge intelligence module 340.

Charging and accounting module 350 may capture chargeable events and generates recorded information for charging. In one implementation, charging and accounting module 350 may interact with a charging system in an underlying service provider network.

Partner service module 355 may provide services incorporated with external partners. For example, a location-based service may provide capabilities to obtain and manage geographical location information based on requests from IoT devices 140 and service applications. To do this, partner service module 355 may interact with external sources (e.g., a partner's location server in the underlying network based on cell-ID, assisted-GPS, fingerprint technology, etc.).

External plugin manager 360 may allow third-party developers to submit and integrate virtual device proxies (VDPs) into IoT distribution hub 130. External plugin manager 360 may enable registration and provide SDKs and protocols for enabling exchange to IoT data with plug-in VDPs.

In order to work with multiple hosting platforms, IoT distribution hub 130 implements virtual device proxies (VDPs) 365 associated with each available hosting platform 150. A VDP 365 is a virtual device instance implemented with open southbound APIs of the corresponding hosting platform 150. Service nodes 135 in IoT distribution hub 130 map an IoT device 140 to the VDP 365 interfacing with the hosting platform 150 configured by the device owner. As described further herein, service nodes 135 in IoT distribution hub 130 may map an IoT device 140 to one or more selected hosting platforms 150 through VDP(s) 365.

Although FIG. 3 shows exemplary logical components of service node 135, in other implementations, service node 135 may include fewer logical components, different logical components, or additional logical components than depicted in FIG. 3. For example, in another implementation, VDPs 365 may be included in one or more separate network devices apart from service nodes 135. Additionally or alternatively, one or more logical components of service node 135 may perform functions described as being performed by one or more other logical components.

Figure 4:
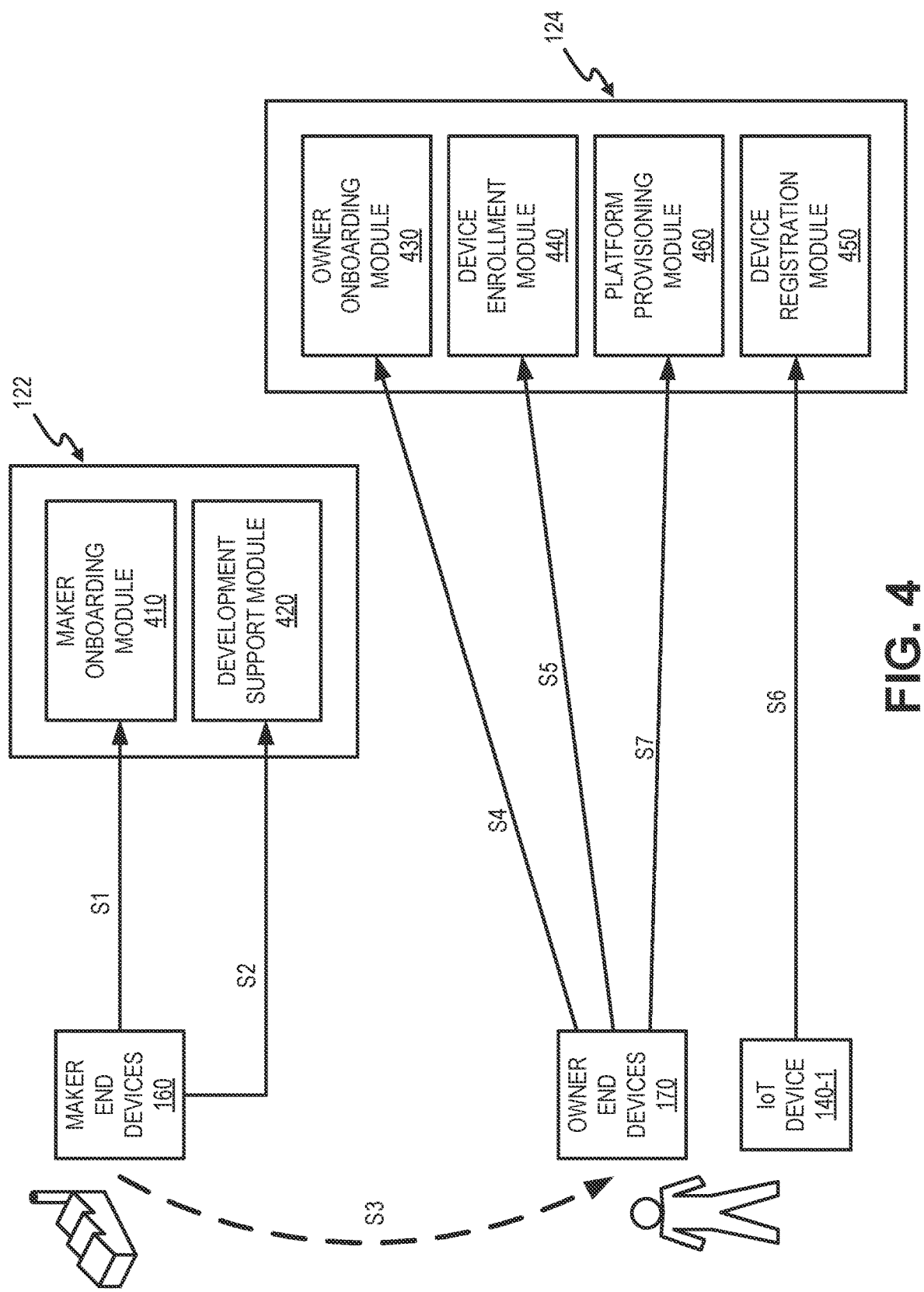
FIG. 4 is a diagram illustrating communications for activating an IoT device among components in a portion of the IoT distribution hub of FIG. 1.

FIG. 4 is a diagram illustrating exemplary communications for activating an IoT device among components in a portion of environment 100. As shown in FIG. 4, IoT maker portal 122 may include a maker onboarding module 410 and a development support module 420. IoT owner portal 124 may include an owner onboarding module 430, a device enrolment module 440, a device registration module 450, and a platform provisioning module 460. Generally, maker onboarding module 410, development support module 420, owner onboarding module 430, device enrolment module 440, device registration module 450, and platform provisioning module 460 serve as front-end devices to provide access to serves from nodes in service network 120 and/or IoT distribution hub 130.

A device maker may use maker end devices 160 to communicate with IoT maker portal 122. Referring to step S1 of FIG. 4, maker end devices 160 may communicate with maker onboarding module 410 to open a device maker account, which may include a password and/or other credentials to access services through IoT maker portal 122. According to one implementation, in order for IoT device makers to work with IoT distribution hub 130, the makers must be registered via an authorized onboarding process using maker onboarding module 410. Once confirmed, a new account will be created and a new manufacture identifier (ID) is assigned to the device manufacturer.

As shown in step S2, maker end devices 160 may log in to IoT maker portal 122 (e.g., using the previously established account) to access, from development support module 420, development services for new IoT devices. Development services may include, for example, application development tools, such as software development kits (SDK) and API catalogs. Using services from development support module 420, the device maker may prepare, build, test and ship IoT devices (e.g., IoT devices 140). The device maker may acquire the credentials embedded inside an IoT device 140. Major credentials are a unique device ID and passcode. The unique device ID may include, for example, an international mobile equipment identity (IMEI), an integrated circuit card identifier (ICCID), or object identifier (OID). For instance, an IMEI and ICCID can be used for IoT devices equipped with 3GPP and a SIM, while an OID can be used for other types of IoT devices. The passcode may be used for an IoT device 140 authentication during registration and assigned via IoT owner portal 124 by the device maker, which may be shared with IoT distribution hub 130. With inputs from the IoT device maker via maker end devices 160, IoT maker portal 122 provides a device ID, a passcode and an IoT distribution hub 130 uniform resource identifier (URI) per IoT device and returns them to the IoT device maker. The device ID, passcode and URI may be embedded into IoT device 140 along with a security key at manufacturing and then IoT device 140 can be shipped.

At step S3, IoT device are shipped and eventually delivered (e.g., after direct order or via retail purchase) to an IoT device owner that uses owner end devices 170. As shown in step S4 a device owner may open a device owner account using owner onboarding module 430 of IoT owner portal 124. According to one implementation, in order for IoT device owners to work with IoT distribution hub 130, they must be registered via an authorized onboarding process as an owner (e.g., differentiated from a maker). For example, to open a new account, the device owner may provide an on-line registration form using owner end device 170 and submit it for approval via owner onboarding module 430. As part of a registration, owners may obtain and/or create a unique device owner ID, home URI, and an access control policy.

Once registered via owner onboarding module 430, device owners may enroll IoT devices 140 within their owner home location. As shown in step S5, owner end devices 170 may provide the IoT device ID and passcode (e.g., both as provided by the manufacturer of IoT device 140) to device enrollment module 440 to enroll IoT device 140. Enrolling IoT device 140 includes proving user authorization for registering IoT device 140. Both the device ID and passcode are used to authenticate IOT device 140 during a subsequent device registration. Therefore, the device ID and passcode are the same as embedded in the device by the manufacturer (the device ID and passcode may be provided, for example, as part of product packaging or via response to an electronic request after purchase). Once IoT device 140 has been enrolled, it is ready to be deployed and used in the field.

In step S6, IoT device 140 may be registered with device registration module 450. In order for IoT device 140 to operate with IoT distribution hub 130, IoT device 140 is first registered via device registration module 450. Device registration may be performed, for example, when first turning on IoT device 140 after the enrollment of step S5. In one implementation, only enrolled devices can be registered to provide adequate security. According to an implementation, IoT device 140 is authenticated with the device ID and passcode provided during registration. With successful registration, a device key (or dkey) is delivered to IoT device 140. The dkey is used, for example, as a token for authenticating API calls to IoT distribution hub 130.

As shown in step S7, device owners may use platform provisioning module 460 to perform dynamic platform provisioning and switching. A successfully-registered IoT device 140 may be provisioned to a hosting platform (e.g., one of hosting platforms 150) chosen by the owner. Registered IoT devices 140 can be provisioned individually or in group. As described herein, two types of provisioning services are available via platform provisioning module 460: late platform provisioning and platform switching. The late platform provisioning is executed for the first use of IoT device 140.

Figure 5A:
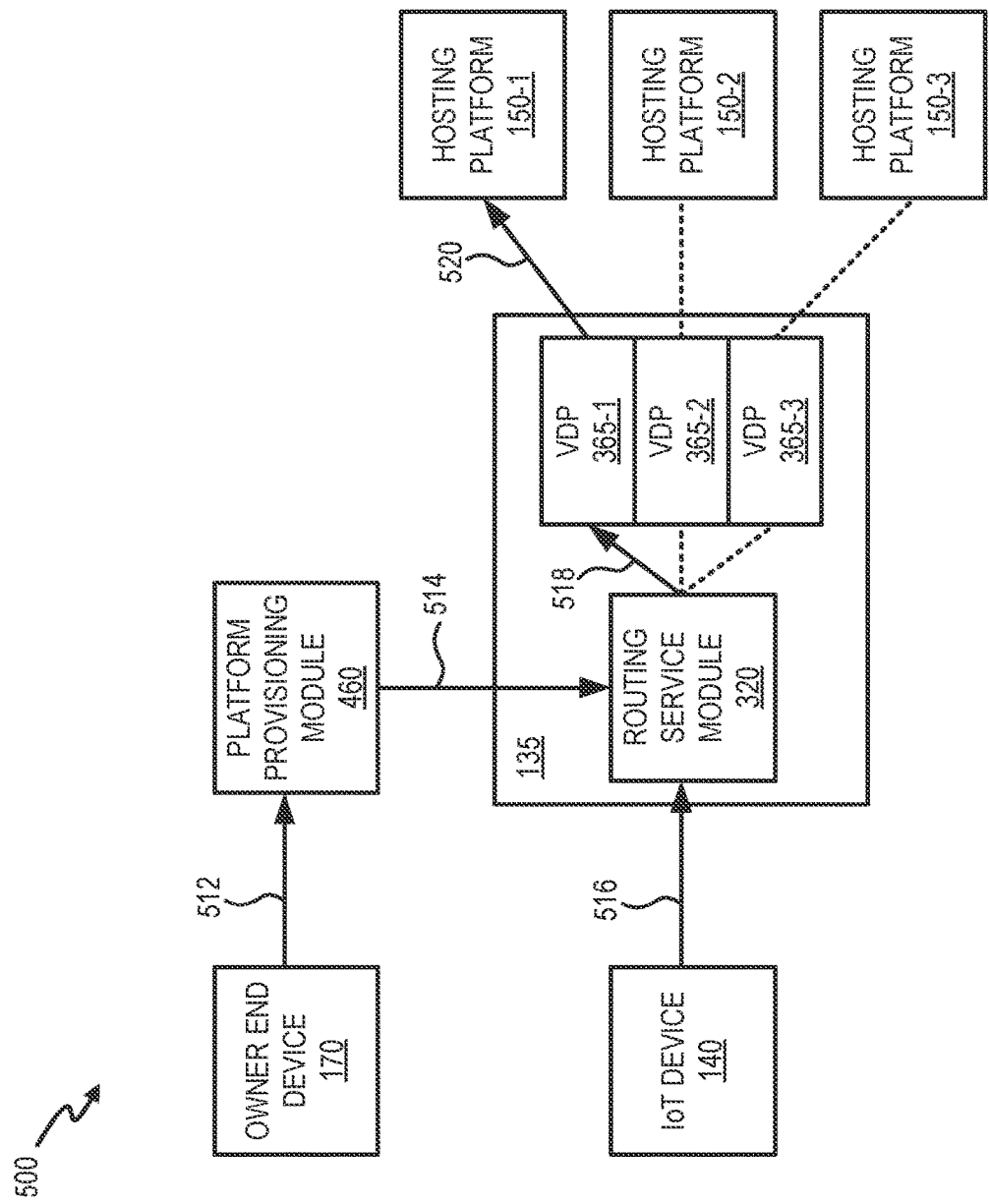
FIGS. 5A-5C are block diagrams illustrating communications for provisioning an IoT device among components in a portion of the environment of FIG. 1.

Late provisioning is described further in connection with FIG. 5A, which shows exemplary communications in a portion 500 of network environment 100. As used herein, the term "late" means provisioned at actual deployment by the owner, in contrast with pre-provisioned during manufacture by device maker. Late provisioning is beneficial for device makers in that platform selection is removed from consideration at the manufacturing process. The device maker can make one version of IoT device 140 interfacing with IoT distribution hub 130 and ship it for sale. Then, IoT device 140 may be provisioned to work with any of hosting platforms 150 via late provisioning by the device owner.

Referring to FIG. 5A, a device owner may use owner end device 170 to log into an owner account for IoT device 140 and access platform provisioning module 460. Once logged in, at step 512, owner device 170 may provide selection of a hosting platform (i.e., hosting platform 150-1) from a group of available hosting platforms 150 indicated by platform provisioning module 460. Platform provisioning module 460 may forward the hosting platform selection 514 to one or more service nodes 135 of IoT distribution hub 130.

Routing services module 320 of service node 135 may receive hosting platform selection 514 and update a routing table or other information to associate IoT device 140 with hosting platform 150-1. After hosting platform selection 514, IoT device 140 may connect to IoT distribution hub 130 (e.g., via access network 105) to send data 516. For example, IoT device 140 may provide a request (e.g., an API call) to forward IoT data 516. IoT data 516 may be formatted, for example, in accordance with APIs (based on information from development support module 420 for using IoT distribution hub 130). Routing service module 320 may receive data 516 and route 518 the data toward the VDP associated with the selected hosting platform (i.e., VDP 365-1 corresponding to hosting platform 150-1). VDP 365-1 may convert data format and implement southbound APIs to provide formatted data 520 to, and receive instructions from, hosting platform 150-1.

Figure 5B:
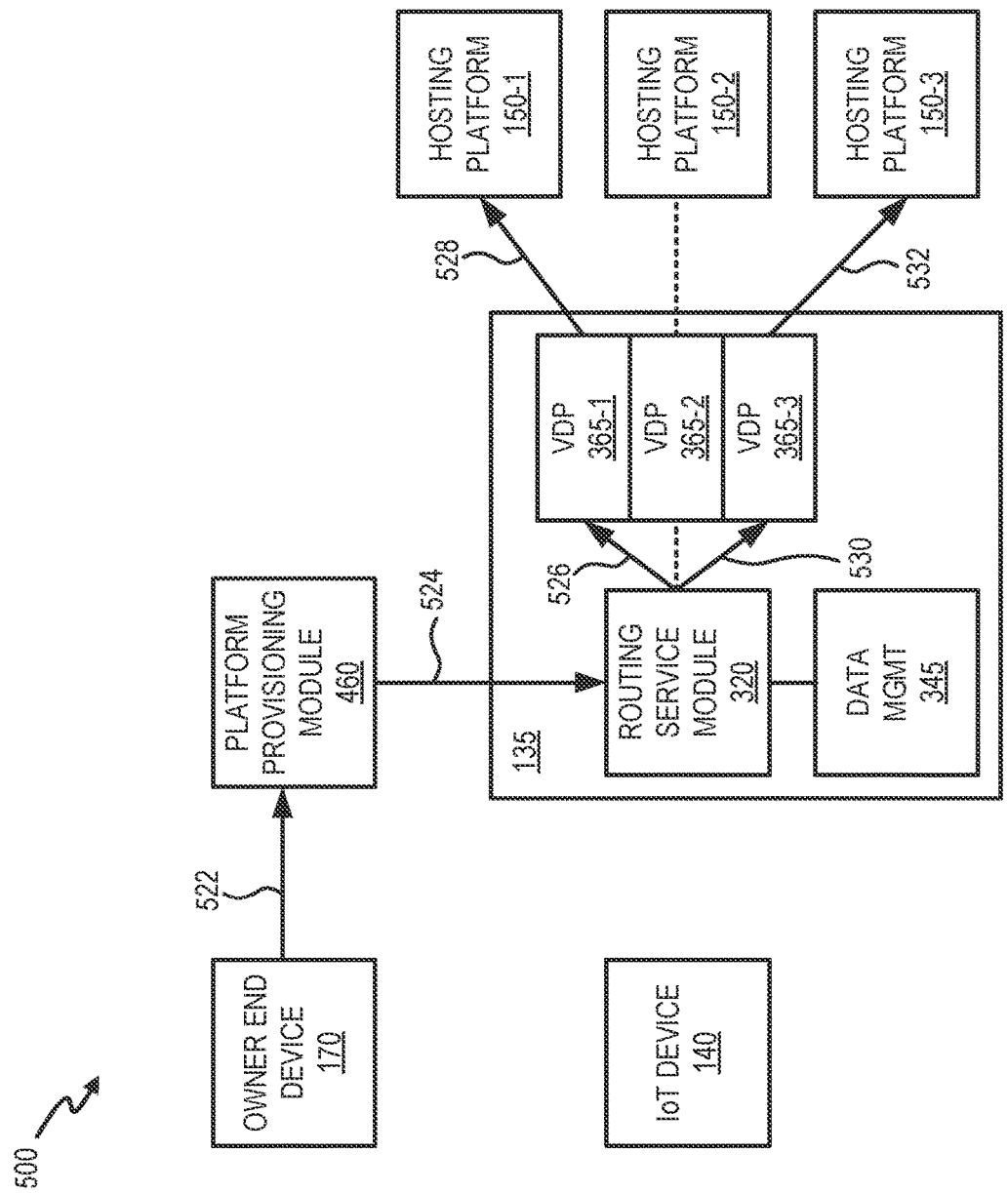

Platform switching is described further in connection with FIG. 5B, which shows additional exemplary communications in portion 500 of network environment 100. Platform switching may be used when the device owner wants to change the current hosting platform 150 (e.g., due to business needs, etc.). An owner may select a new hosting platform 150 and migration time. Referring to FIG. 5B, a device owner may use owner end device 170 to log into an owner account for IoT device 140 and access platform provisioning module 460. Once logged in, at step 522, owner device 170 may provide selection of a new hosting platform (i.e., hosting platform 150-3) from the group of available hosting platforms 150 indicated by platform provisioning module 460. The selection may also include a changeover time, such as an off-peak period for IoT device 140. Platform provisioning module 460 may forward the new hosting platform selection 524 to one or more service nodes 135 of IoT distribution hub 130.

Service node 135 may receive hosting platform selection 524. At the selected changeover time, service node 135 may send a deregistration signal 526 to VDP 365-1. In response, VDP 365-1 may generate and send a deregistration message 528 to hosting platform 150-1. Also at the selected changeover time, service node 135 may send a registration signal 530 to VDP 365-3. In response, VDP 365-3 may generate and send a registration message 532 to hosting platform 150-1. Upon successful registration service node 135 (e.g., routing module 320) may update a routing table or other information to associate IoT device 140 with hosting platform 150-3. In one implementation, IoT distribution hub 130 (e.g., data management module 345) may store a master historical dataset for IoT device 140 and then deliver it to the newly chosen hosting platform (hosting platform 150-3). In another implementation, for graceful platform switching, service node 135 may use data replication during the migration period.

Figure 5C:
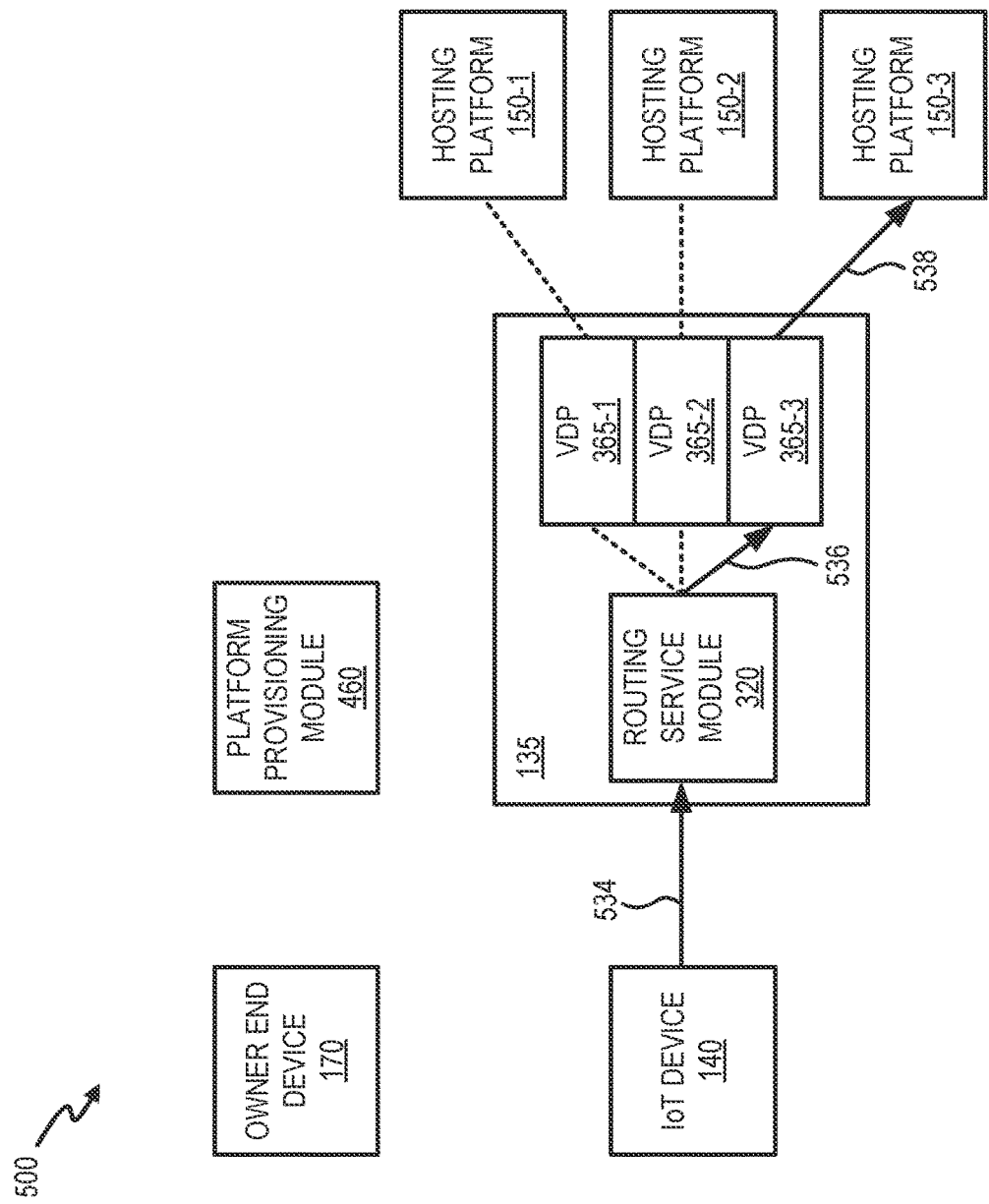

Referring to FIG. 5C, at a time after registration 532, IoT device 140 may connect to IoT distribution hub 130 (e.g., via access network 105) to send data 534. Data 534 may be formatted, for example, in accordance with APIs (based on information from development support module 420). Routing service module 320 may receive data 534. Similar to communications described above in connection with FIG. 5A, routing service module 320 may route 536 the data toward the VDP associated with the newly selected hosting platform (i.e., VDP 365-3 corresponding to hosting platform 150-3). VDP 365-3 may convert data format and implement southbound APIs to provide formatted data 538 to, and receive instructions from, hosting platform 150-3.

Figure 6:
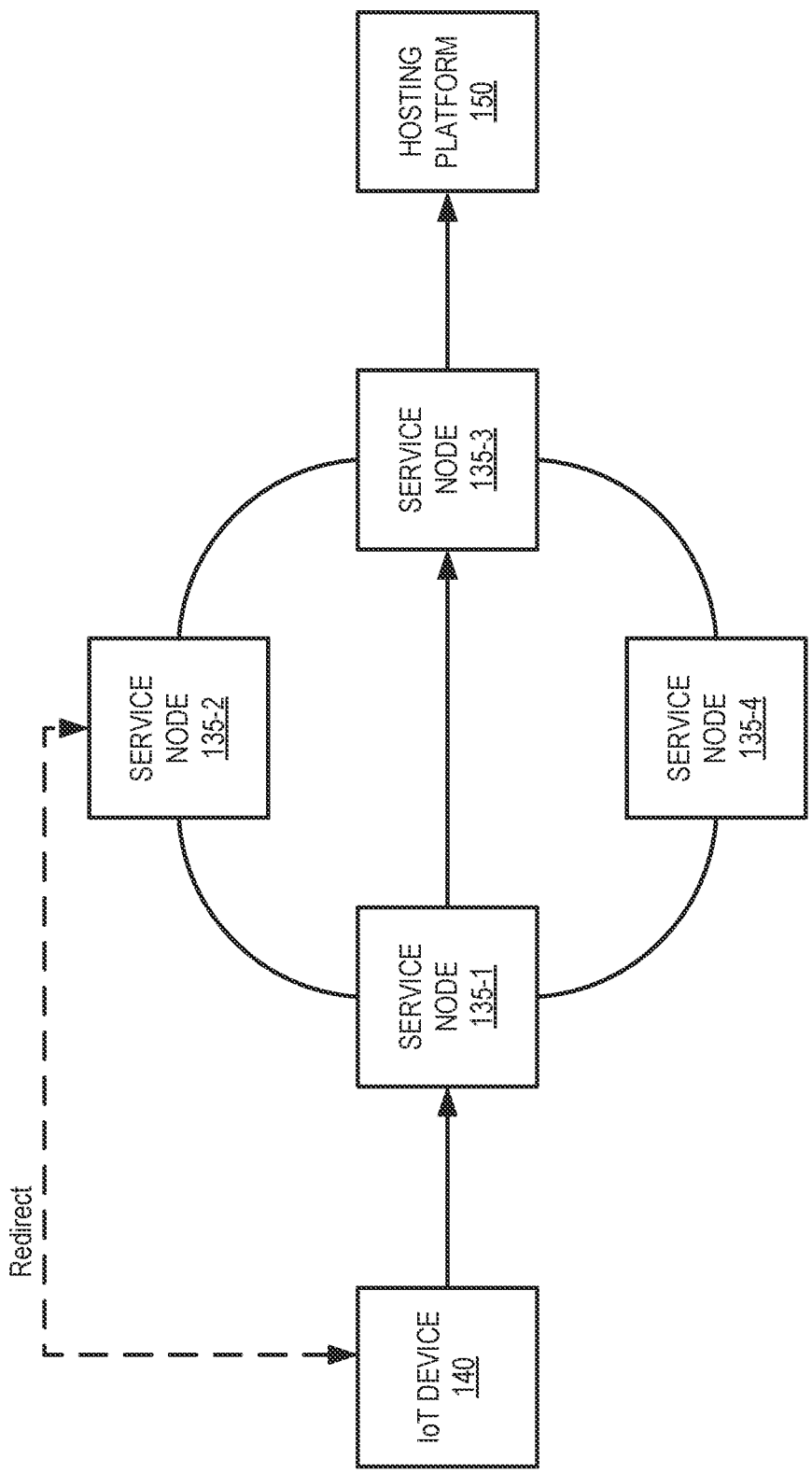
FIG. 6 is a block diagram illustrating communications for routing requests among components in a portion of the environment of FIG. 1.

FIG. 6 is a block diagram illustrating communications for routing requests among components in a portion 600 of environment 100. As shown in FIG. 6, network portion 600 may include multiple service nodes 135 in IoT distribution hub 130, IoT device 140, and hosting platform 150. For a global platform, IoT distribution hub 130 may deliver IoT data with low latency. In one implementation, IoT distribution hub 130 may provide a delivery optimization service relying on request routing and/or dynamic site acceleration.

In order to make IoT device 140 connect to the closest service node 135, a request routing technology is used. The request routing may work using either DNS-based or HTTP-redirect or anycast technology. When IoT device 140 makes a connection request, the request is directed to a service node 135 in closest proximity to IoT device 140. Minimizing geographic distance between IoT device 140 and service node 135 can significantly reduce the traffic latency. In one implementation, IoT distribution hub 130 may leverage geo-proximity routing resources from content delivery networks. The request routing can also provide high availability across the distributed service nodes 135 in IoT distribution hub 130. When any service node 135 fails, the failed service node is detected and removed from the list of available nodes, so the next optimal node can be selected without service interruption.

Additionally, service node 135 may apply dynamic site acceleration (DSA) to received IoT data. DSA may be used to accelerate data exchanges between service nodes 135 in IoT distribution hub 130, particularly an ingress service node 135 connected to IoT device 140 (e.g., service node 135-1 in FIG. 6) and an egress service node 135 to hosting platform 150 (e.g., service node 135-3 in FIG. 6). Key technologies used in DSA may include TCP optimization, secure socket layer (SSL) offload, route optimization, on-the-fly compression, connection management, and data aggregation.

Figure 7:
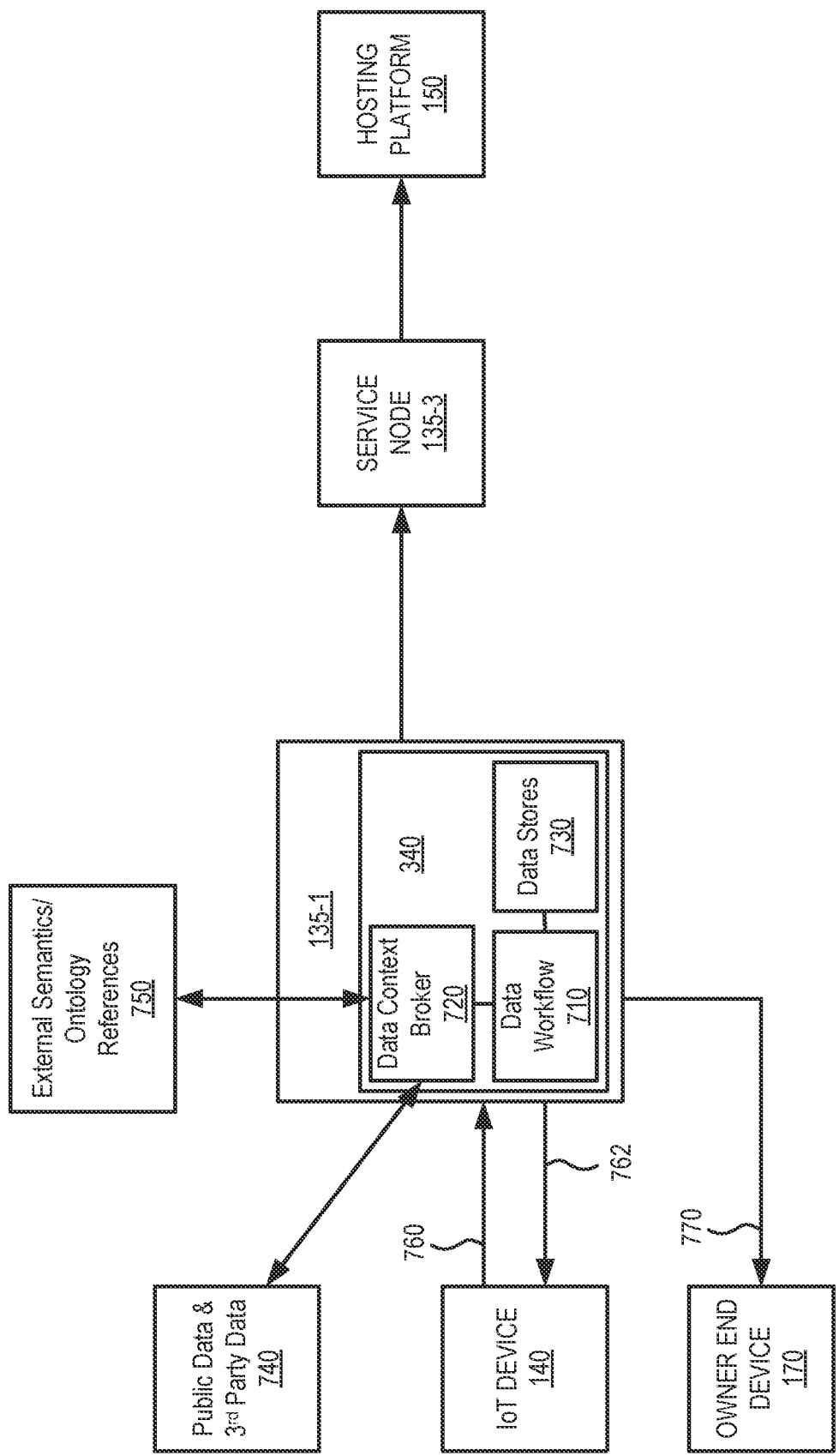
FIG. 7 is a block diagram illustrating logical functions and communications of an edge intelligence module of a service node in a portion of the environment of FIG. 1.

FIG. 7 is a block diagram illustrating logical functions and communications of edge intelligence module 340 of service node 135. As shown in FIG. 7, edge intelligence module 340 may include a data workflow unit 710, a data context broker 720, and a data store 730.

According to an implementation, IoT distribution hub 130 may use edge computing to apply intelligence at edge service nodes 135 of IoT distribution hub 130. Edge computing may allow a service node 135 to process IoT data from IoT device 140 near the collection point in order to minimize data backhauling and latency. The edge service node 135 may correspond, for example, to an ingress service node 135 (e.g., service node 135-1) for each IoT device 140. In contrast with a centralized analytic platform, service nodes 135 may provide real-time feedback that may allow for notification, automation, and predictive maintenance for users of IoT devices 140.

Data workflow unit 710 may receive (or ingest) IoT data from IoT device 140. Data workflow unit 710 may collect and prepare context data by monitoring certain well-defined event streams and changes in databases and data stores across the distributed environment. Then, data workflow processes it to enrich, cleanse and/or analyze it; and deliver it to hosting platform 150 and/or service applications. Data workflow unit 710 may include a rules engine and implement Complex Event Processing (CEP). CEP is a real-time technology for processing IoT data. CEP allows for matching of time-series data patterns coming from different sources. CEP may be applied in data workflow unit 710 at distributed edge nodes (service nodes 135).

Data context broker 720 may use external interfaces to collect and apply public data and third-party data from sources 740 and IoT semantics and ontology references 750. IoT semantics and ontology references 750 may include, for example, one or more standards of data models for IoT devices, including Open Geospatial Consortium Sensor Web Enablement (SWE), Semantic Sensor Network (SSN) ontology, Smart Home Abstraction Layer (SHAL), etc.

Data store 730 may include a distributed data replication store shared among service nodes 135 and used by data workflow unit 710 for monitoring and analysis.

As shown in FIG. 7, service node 135 may receive incoming IoT data 760 from IoT device 140. Edge intelligence module 340 may provide intelligent data analytics using rules engines and complex event processing in data workflow unit 710. Based on the data analytics service node 135 may provide rapid reactive control signals 762 to IoT device 140. Additionally, or alternatively, service node 135 may provide real-time notifications 770 to owner end device 170. For example, notification 770 may be sent using an external notification service, such as SMS, email, Google® cloud messaging (GCM), or Apple® push notification (APN).

Figure 8A:
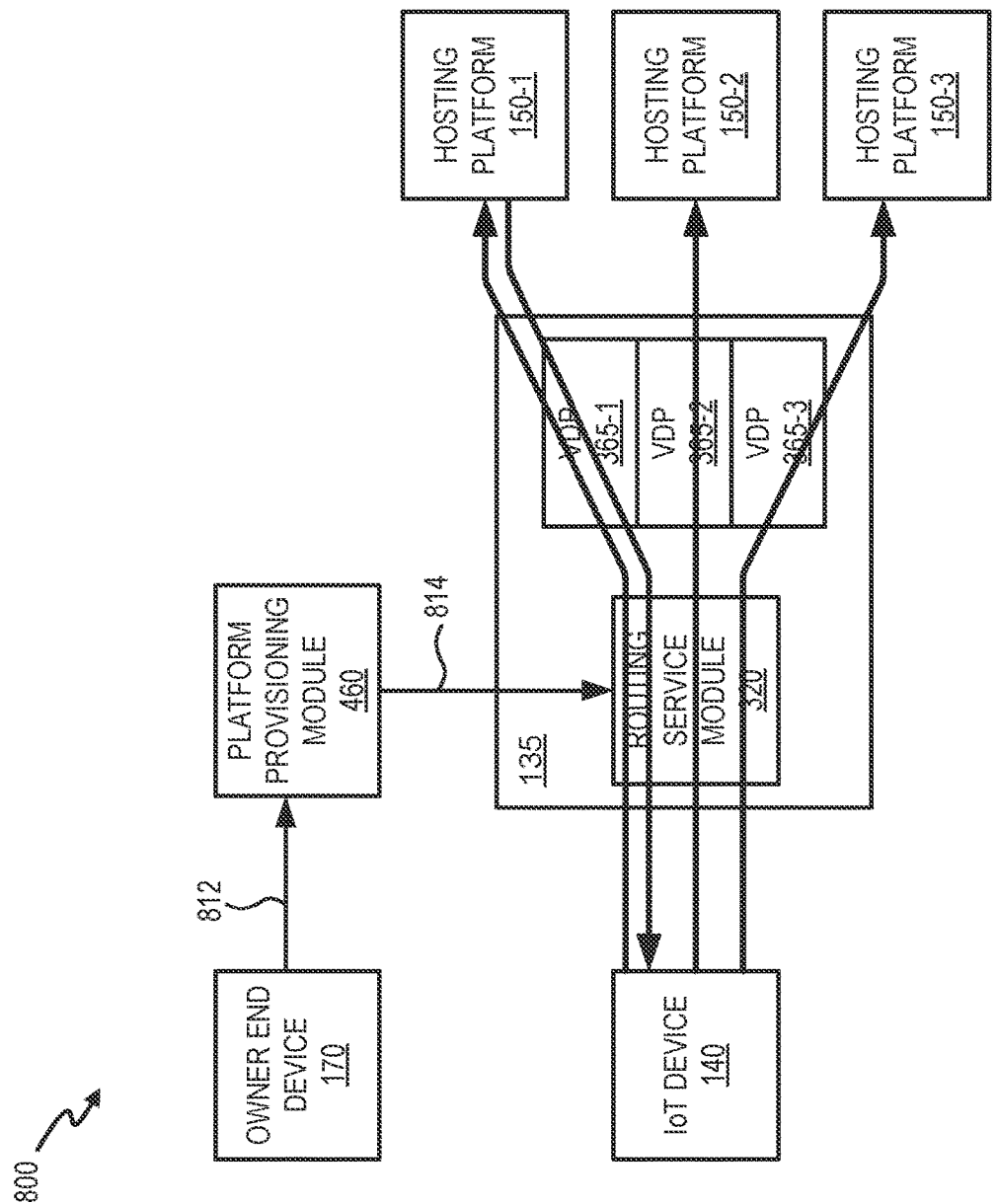
FIG. 8A is a block diagram illustrating multicast and data storage services in a portion of the environment of FIG. 1.
Figure 8B:
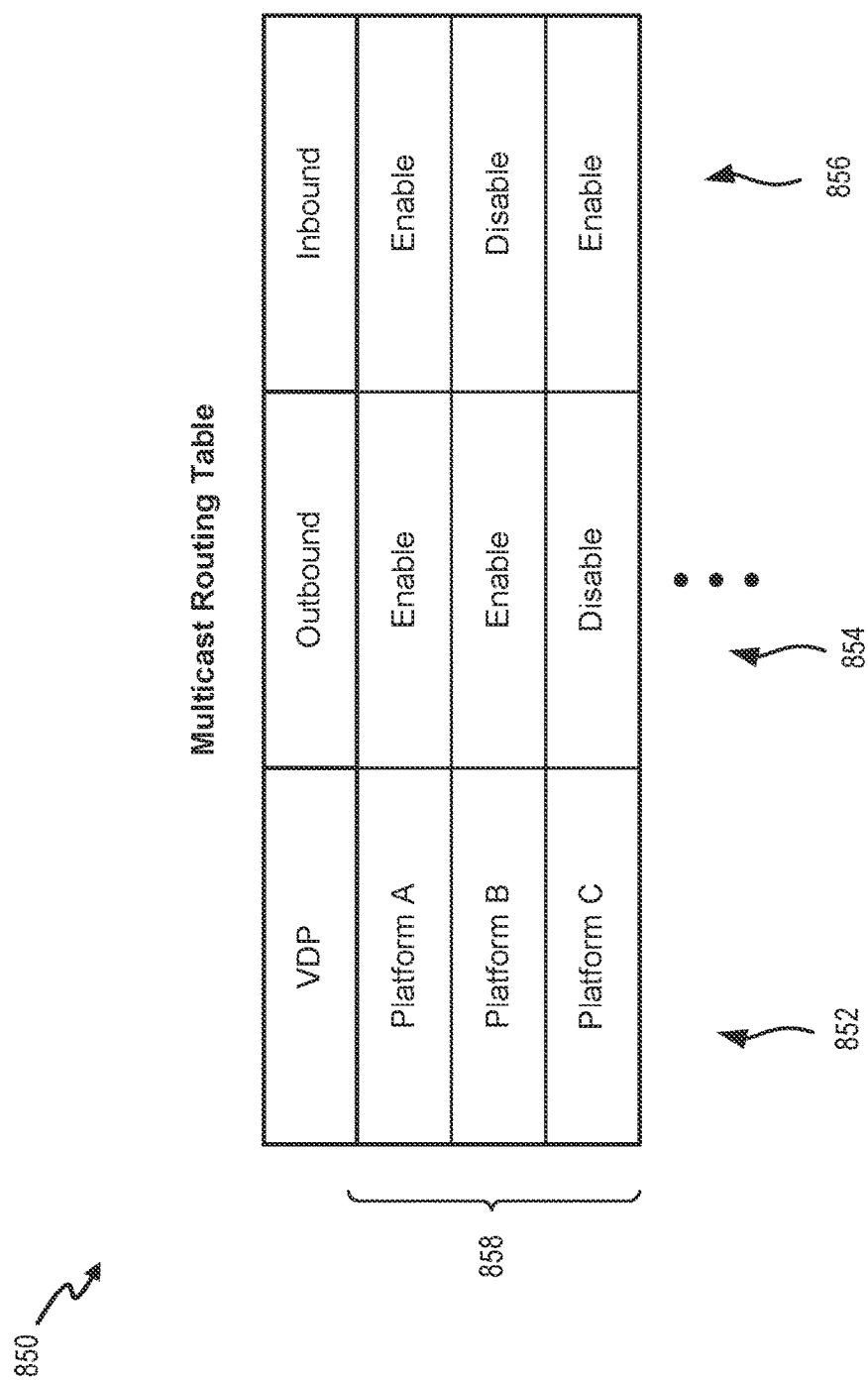
FIG. 8B is an exemplary multicast configuration table for use with the IoT owner portal of FIG. 1.

Platform multicasting and data accumulation services are described further in connection with FIGS. 8A and 8B. FIG. 8A shows exemplary communications in a portion 800 of network environment 100. FIG. 8B shows an exemplary data structure for configuring multicasting and data accumulation services. Referring to FIG. 8A, a device owner may use owner end device 170 to log into an owner account for IoT device 140 and access platform provisioning module 460. Once logged in owner device 170 may provide a selection 812 of multiple hosting platforms from a group of available hosting platforms 150 indicated by platform provisioning module 460. For example, as shown in FIG. 8B, a user may update a data structure (e.g., a multicast routing table 850) that governs IoT data exchanges for IoT device 140.

Multicast routing table 850 (e.g., configured inside routing service module 320) may include a VDP field 852, an outbound data field 854, an inbound data field 856, and a variety of entries 858 for fields 852-856. VDP field 852 may include structured input to indicate a VDP 365 (e.g., Platform A, Platform B, etc.) corresponding to a particular data platform. Outbound data field 854 may include, for example, a toggled entry to enable or disable an outbound communications path from IoT device 140 to a hosting platform associated with the particular VDP in VDP field 852. Inbound data field 856 may include, for example, a toggled entry to enable or disable an outbound communications path to IoT device 140 from a hosting platform associated with the particular VDP in VDP field 852.

An IoT device owner may use owner end device 170 to selectively allow an IoT device 140 or a group of IoT devices 140 to connect multiple hosting platforms 150 at the same time. In one implementation, service node 135 may provide a multicast routing configuration based on multicast routing table 850. In one implementation, as shown in FIG. 8B, inbound and outbound communication paths may be separately configured for each IoT device. Multicasting of IoT data may be used to provide high availability of data for IoT owners/customer. Additionally, or alternative, multicasting of IoT data may be used for data accumulation and/or backup services (e.g., where one of hosting platforms 150 provides a data storage service).

Platform provisioning module 460 may forward the user's hosting platform selections 814 to routing services module 320 for implementation in IoT distribution hub 130. In the example of FIGS. 8A and 8B, a device owner configures the multicast routing table 850 to allow sending IoT device data to hosting platform 150-1 (corresponding to "Platform A") and hosting platform 150-2 (corresponding to "Platform B"), but not to hosting platform 150-3 (corresponding to "Platform C"). Furthermore, the device owner allows only hosting platform 150-1 and hosting platform 150-3 to send control signals to IoT device 140. Control signals from the hosting platform 150-2 to IoT device 140 are not allowed and dropped by IoT distribution hub 130.

FIG. 9 is a flow diagram illustrating an exemplary process 900 for providing IoT data to a selected hosting platform. In one implementation, process 900 may be implemented by devices in IoT distribution hub 130, such as one or more service nodes 135. In another implementation, process 900 may be implemented by devices in IoT distribution hub 130 in conjunction with one or more other devices in network environment 100, such as one or more devices in service network 120.

Process 900 may include sending a device key, for accessing an IoT distribution network, to a registered IoT device (block 905) and provisioning the selected hosting platform for the IoT device (block 910). For example, after device enrollment via device enrollment module 440, IoT device 140 register with device registration module 450, when first turning on IoT device 140 after the enrollment. With successful registration, a device key (or dkey) is delivered to IoT device 140. The dkey is used, for example, as a token for API calls to IoT distribution hub 130. A device owner may use platform provisioning module 460 to perform dynamic platform provisioning for IoT device 140. A successfully-registered IoT device 140 may be provisioned to a hosting platform 150 chosen by the owner.

Process 900 may further include mapping the IoT device to a VDP for the selected hosting platform (block 915), and receiving a request from the IoT device to forward IoT data (block 920). For example, service nodes 135 in IoT distribution hub 130 may map an IoT device 140 to a VDP 365 interfacing with the hosting platform 150 selected by the device owner. IoT device 140 may connect to IoT distribution hub 130 to forward IoT data. IoT data 516 may be formatted, for example, in accordance with APIs configured for IoT distribution hub 130. Routing service module 320 may receive the IoT data.

Process 900 may also include forwarding the IoT data to the selected hosting platform via the VDP (block 925). For example, routing service module 320 may route the IoT data toward the VDP 365 associated with the selected hosting platform (e.g., VDP 365-1 corresponding to hosting platform 150-1). VDP 365 may convert the data format and implement southbound APIs to provide formatted data to the hosting platform 150.

Process 900 may additionally include receiving hosting platform change instructions for the IoT device (block 930), sending registration and/or deregistration message to the affected hosting platforms (block 935), re-mapping the IoT device to different virtual device proxies for new hosting platforms (block 940), and forwarding the IoT data to the new hosting platforms via the different virtual device proxies (block 945). For example, service node 135 may receive a new hosting platform selection from platform provisioning module 460. Service node 135 may send a deregistration signal to the old VDP 365 for the old hosting platform. In response, the old VDP 365 may generate and send a deregistration message to the old hosting platform (e.g., hosting platform 150-1). Also, at the selected changeover time, service node 135 may send a registration signal to a VDP 365 for the newly selected hosting platform(s) 150. In response, the new VDP 365 may generate and send a registration message to the new hosting platform (e.g., hosting platform 150-3). Service node 135 (e.g., routing module 320) may update a routing table or other information to map IoT device 140 to the new hosting platform 150-3. Incoming IoT data from IoT device 140 may be forwarded to the new hosting platform 150-3. In another implementation, a new hosting platform 150 may be added for an IoT device 140 without deregistering an existing hosting platform 150. Thus, IoT data from the IoT device 140 may be multicast to both hosting platforms 150.

According to an implementation described herein an IoT distribution hub 130 enables delivery of formatted IoT data to multiple different hosting platforms 150. A distributed service node 135 may provide, to an IoT device, a device key for accessing an IoT distribution network. The distributed service node 135 may receive a selection of a hosting platform for the IoT device, wherein the selected hosting platform is one from group of available hosting platforms 150 available through the IoT distribution network. The distributed service node 135 may map the IoT device to a virtual device proxy 365 for the selected hosting platform 150 and may receive a request from the IoT device to forward IoT data. The request API call may include the device key for authentication purpose. The distributed service node 135 may forward the IoT data to the selected hosting platform 150 via the virtual device proxy 365.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a service node in a distribution network, a selection of a hosting platform, of multiple hosting platforms, for a machine-type communications (MTC) device;
    mapping, by the service node, the MTC device to a virtual device proxy for the selected hosting platform;
    receiving, by the service node, event data from the MTC device;
    routing, by the service node, the event data to the virtual device proxy for the selected hosting platform; and
    converting, by the virtual device proxy for the selected hosting platform, the event data from a first format to a second format.

2. The method of claim 1, further comprising:
    providing, to the MTC device prior to receiving the event data, a device key for accessing the distribution network.

3. The method of claim 2, wherein receiving the event data further comprises:
    receiving an application programming interface (API) call including the event data and the device key, and
    authenticating the MTC device based on the device key.

4. The method of claim 1, wherein each of the multiple hosting platforms is associated with a different virtual device proxy, and wherein each of the different virtual device proxies uses different formats for providing event data.

5. The method of claim 1, further comprising:
    receiving, by the service node, a hosting platform change instruction for the MTC device; and
    sending, by the service node and in response to the hosting platform change instruction, a deregistration message to the virtual device proxy for the selected hosting platform.

6. The method of claim 5, further comprising:
    mapping, by the service node, the MTC device to a different virtual device proxy;
    receiving, by the service node, new event data from the MTC device, after mapping the MTC device to the different virtual device proxy; and
    forwarding, by the service node, the new event data to the different virtual device proxy.

7. The method of claim 1, wherein routing the event data further comprises:
    applying dynamic site acceleration (DSA) to the event data.

8. The method of claim 1, further comprising:
    receiving a connection request from the MTC device; and
    directing the connection request to the service node, of multiple service nodes, in closest geographic proximity to the MTC device.

9. The method of claim 1, wherein the service node is a network device in a distributed network of service nodes, and
    wherein the mapping includes providing an updated entry in a routing table and propagating the updated entry to other service nodes in the distribution network.

10. A network element, comprising:
    a processor configured to:
        receive, by the network element in a distribution network, a selection of a hosting platform, of multiple hosting platforms, for a machine-type communications (MTC) device;
        map the MTC device to a virtual device proxy for the selected hosting platform;
        receive event data from the MTC device;
        route the event data to the virtual device proxy for the selected hosting platform;
        receive a hosting platform change instruction for the MTC device; and
        send, in response to the hosting platform change instruction, a deregistration message to the virtual device proxy for the selected hosting platform.

11. The network element of claim 10, wherein the processor is further configured to:
    provide, to the MTC device prior to receiving the event data, a device key for accessing the distribution network.

12. The network element of claim 11, wherein the processor is further configured to:
    receiving an application programming interface (API) call including the event data and the device key, and
    authenticating the API call based on the device key.

13. The network element of claim 10, wherein each of the multiple hosting platforms is associated with a different virtual device proxy, and wherein each of the different virtual device proxies uses different formats for providing event data.

14. The network element of claim 10, wherein the processor is further configured to:
    map the MTC device to a different virtual device proxy;
    receive new event data from the MTC device, after mapping the MTC device to the different virtual device proxy; and
    forward the new event data to the different virtual device proxy.

15. The network element of claim 10, wherein, when routing the event data, the processor is further configured to:
    apply dynamic site acceleration (DSA) to the event data.

16. The network element of claim 15, wherein, when applying the DSA to the event data, the processor is further configured to:
    perform one of Transmission Control Protocol (TCP) optimization, secure socket layer (SSL) offload, route optimization, on-the-fly compression, connection management, or data aggregation.

17. A non-transitory computer-readable medium containing instructions executable by at least one processor, the instructions being configured for:
    receiving, by a service node in a distribution network, a selection of a hosting platform, of multiple hosting platforms, for a machine-type communications (MTC) device;
    mapping, by the service node, the MTC device to a virtual device proxy for the selected hosting platform;
    receiving, by the service node, event data from the MTC device;
    routing, by the service node, the event data to the virtual device proxy for the selected hosting platform;
    receiving, by the service node, a hosting platform change instruction for the MTC device; and sending, by the service node and in response to the hosting platform change instruction, a deregistration message to the virtual device proxy for the selected hosting platform.

18. The non-transitory computer-readable medium claim 17, further comprising instructions for:
providing, to the MTC device prior to receiving the event data, a device key for accessing the distribution network;
receiving the device key with the event data; and
authenticating the MTC device, based on the device key.

19. The non-transitory computer-readable medium claim 17, wherein the instructions for routing the event data further comprise instructions for:
applying dynamic site acceleration (DSA) to the event data.

20. The non-transitory computer-readable medium of claim 19, wherein the instructions for applying the DSA to the event data further comprising instructions for:
performing one of Transmission Control Protocol (TCP) optimization, secure socket layer (SSL) offload, route optimization, on-the-fly compression, connection management, or data aggregation.

\* \* \* \* \*